J. FREISTADTER.
HAIR SPRING COLLET FOR WATCHES.
APPLICATION FILED OCT. 7, 1914.
1,136,950.
Patented Apr. 27, 1915.
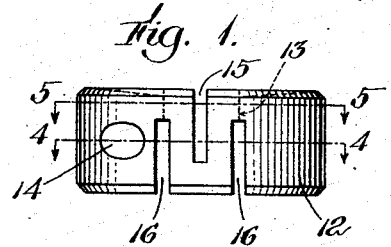
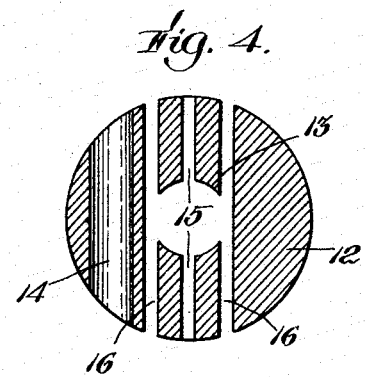
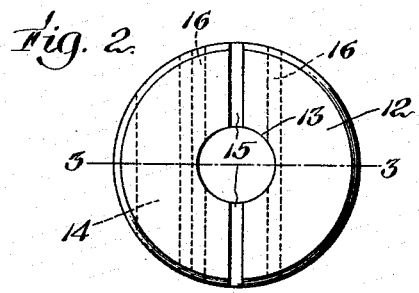
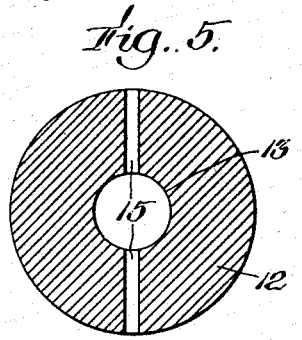
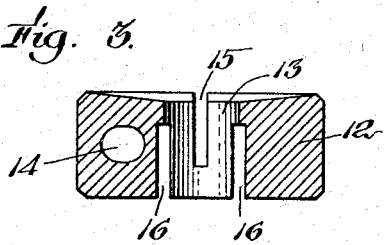
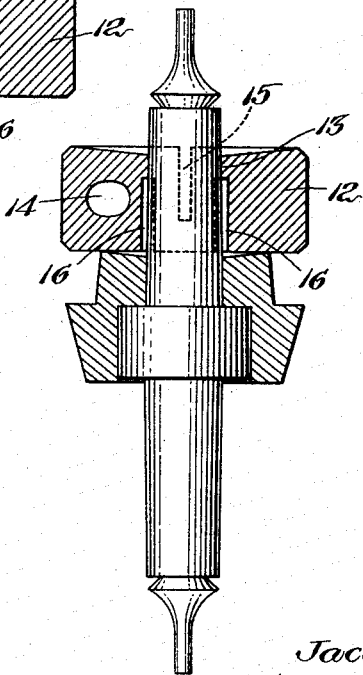
Witnesses:
Inventor:
Jacob Freistadter,
by Attorneys.

UNITED STATES PATENT OFFICE.

JACOB FREISTADTER, OF WALTHAM, MASSACHUSETTS.

HAIR-SPRING COLLET FOR WATCHES.

1,136,950.  Specification of Letters Patent.  Patented Apr. 27, 1915.

Application filed October 7, 1914.  Serial No. 865,474.

*To all whom it may concern:*

Be it known that I, JACOB FREISTADTER, a citizen of the United States, and resident of Waltham, in the county of Middlesex and State of Massachusetts, have invented certain new and useful Improvements in Hair-Spring Collets for Watches, of which the following is a specification.

This invention relates to collets employed for connecting watch balance hair springs to balance staffs, and is embodied in a collet which is a continuous ring instead of being a ring the continuity of which is entirely interrupted at one side and is variable in diameter, my improved collet being therefore perfectly poised because its weight is uniformly distributed and is not decreased at one side as would be the case if its continuity were interrupted at one side.

The collet of my invention, while constituting a continuous poised ring the periphery and bore of which are not variable in diameter by an action like the opening and closing of a cut or non-continuous ring, has a bore which is variable to such an extent that it is self-conforming from end to end to the collet-engaging portion of a balance staff so that said bore is adapted to closely fit a staff portion which differs slightly in form from the normal form of the bore. For example, if the bore is cylindrical and the staff is slightly tapering the bore will conform accurately to the staff and have a close frictional fit thereon.

I attain the objects of my invention by the construction which I will now proceed to describe.

Of the accompanying drawings forming a part of this specification: Figure 1 represents an edge view of a collet embodying my invention; Fig. 2 represents a side view of the same; Fig. 3 represents a section on line 3—3 of Fig. 2; Fig. 4 represents a section on line 4—4 of Fig. 1; Fig. 5 represents a section on line 5—5 of Fig. 1; Fig. 6 represents a view similar to Fig. 3, showing the collet engaged with a balance staff.

The collet is shown on an enlarged scale in all the figures.

The same reference characters indicate the same or similar parts in all the views.

In making my improved collet I form a continuous ring 12 having a staff-receiving bore 13 and an orifice 14 at one side of the bore for the reception of one end of the usual hair spring, said spring being secured in the orifice 14 in any suitable way. In one side of the ring I form a slot 15 which extends partly, but not entirely, to the opposite side of the ring and intersects the bore 13, the continuity of the slot 15 being interrupted by the bore. In other words, the slot 15 is made in two parts alined with each other and separated from each other by the bore. In the opposite side of the ring I form two slots 16 which extend entirely across one side of the ring and partly, but not entirely, to the side in which the two-part slot 15 is formed, the slots 16 partly intersecting the bore 13, as shown by Figs. 3 and 4. The slots 16 are at opposite sides of the two-part slot 15 and are separated therefrom, as shown.

All watches, including so-called precision or adjusted watches, show in some degree a position error when tested by running them in different positions, and this error has heretofore been due in part to the fact that the hair spring collet is not accurately poised, or is non-poised, because its continuity is entirely interrupted at one side to give it the desired flexibility and adjustability, the collet being in effect a cut ring which is lightest at its cut side. This lack of poise in the collet helps to cause a position error in the rate of watches and other portable time pieces.

Since the collet of my invention is not lighter at any point on its perimeter than at a diametrically opposite point, it follows that the collet is always in poise and is not a factor in causing a position error.

It will be seen that while the continuity of the collet is not interrupted and the bore thereof is not capable of expanding and contracting like the bore of a collet which is entirely interrupted or cut at one side, the bore has a skeleton form which renders it suitably flexible or self-conforming from end to end to the collet-engaging portion 18 of a balance staff, so that in case the bore 13 is cylindrical and the staff portion 18 is tapering, the bore conforms accurately to the staff when the collet is forced onto the same.

It will also be seen that the bore is adapted by the described construction to conform to slight irregularities in the form of a substantially cylindrical staff.

I believe myself to be the first to provide a poised continuous hair spring collet having a staff-receiving bore the wall of which entirely surrounds the collet-engaging portion of a balance staff and is self-conforming from end to end to the collet-engaging portion of a balance staff. I do not therefore limit myself to the precise construction shown and described whereby the collet is poised and its bore is rendered self-conforming, and may variously modify the construction to produce the described results without departing from the spirit of the invention.

Having described my invention, I claim:

1. A hair spring collet having a staff-receiving bore formed to entirely surround the collet-engaging portion of a balance staff, whereby the collet is poised, said bore being self-conforming from end to end to said portion.

2. A hair spring collet having a staff-receiving bore formed to entirely surround the collet-engaging portion of a balance staff, whereby the collet is poised, said bore being non-continuous at both end portions whereby it is adapted to conform either to a taper or to slight irregularities of said portion.

3. A poised continuous hair spring collet slotted partly across from opposite sides, said slots intersecting the wall of the staff-receiving bore of the collet, and rendering said wall self-conforming to the collet-engaging portion of a balance staff.

In testimony whereof I have affixed my signature, in presence of two witnesses.

JACOB FREISTADTER.

Witnesses:
E. P. BRANNEN,
P. W. PEZZETTI.

Copies of this patent may be obtained for five cents each, by addressing the "Commissioner of Patents, Washington, D. C."